(12) United States Patent
Hsu et al.

(10) Patent No.: US 7,272,387 B2
(45) Date of Patent: Sep. 18, 2007

(54) ISLAND TYPE MOBILE COMMUNICATION ARRANGEMENT

(75) Inventors: Ching-Hsiang Hsu, Taipei (TW);
 Charlie C. Chen, Taipei (TW);
 Hsiao-Wei Hsu, Keelung (TW);
 Kan-Lin Lee, Tucheng (TW)

(73) Assignee: Far EasTone Telecommunications Co., Ltd., Taipei (TW)

( * ) Notice: Subject to any disclaimer, the term of this patent is extended or adjusted under 35 U.S.C. 154(b) by 350 days.

(21) Appl. No.: 10/714,626

(22) Filed: Nov. 18, 2003

(65) Prior Publication Data

US 2005/0037812 A1 Feb. 17, 2005

(30) Foreign Application Priority Data

Aug. 12, 2003 (TW) .............................. 92122174 A

(51) Int. Cl.
 *H04Q 7/22* (2006.01)
(52) U.S. Cl. .............................. 455/414.1; 455/432.1; 455/432.2; 455/432.3; 455/433; 455/414.2; 455/456.1; 455/466
(58) Field of Classification Search ............. 455/432.1, 455/432.2, 432.3, 433, 414.1, 414.2, 414.3, 455/414.4, 456.1, 456.2, 456.3, 456.4, 456.5, 455/456.6, 457

See application file for complete search history.

(56) References Cited

U.S. PATENT DOCUMENTS

| | | | | |
|---|---|---|---|---|
| 6,397,058 | B1 * | 5/2002 | Thibert et al. ........... | 455/414.1 |
| 6,763,004 | B1 * | 7/2004 | De Oliveira ............... | 370/312 |
| 6,832,093 | B1 * | 12/2004 | Ranta ...................... | 455/456.4 |
| 7,133,684 | B2 * | 11/2006 | Farley et al. ............ | 455/456.1 |
| 2001/0005676 | A1 * | 6/2001 | Masuda et al. ............. | 455/433 |
| 2002/0151307 | A1 * | 10/2002 | Demarez et al. ........... | 455/445 |

* cited by examiner

*Primary Examiner*—Joseph Feild
*Assistant Examiner*—Olumide Ajibade-Akonai
(74) *Attorney, Agent, or Firm*—Bacon & Thomas, PLLC

(57) ABSTRACT

An island type mobile communication arrangement is disclosed. A plurality of BTSs connected to BSCs are reassigned as island BTSs and connected to an island BSC, the island BSC is connected to an island MSC. When entering or leaving the scope of the island MSC, a cellular phone performs a location updating procedure, and thus the island type mobile communication arrangement can provide a special service to all cellular phones in a particular local area by reading MSISDNs in an island VLR corresponding to the island MSC.

14 Claims, 5 Drawing Sheets

ISLAND TYPE MOBILE COMMUNICATION ARRANGEMENT

BACKGROUND OF THE INVENTION

1. Field of the Invention

The present invention relates to a mobile communication arrangement and, more particularly, to an island type cellular based mobile communication arrangement.

2. Description of Related Art

Mobile communication technology has known a rapid, spectacular development leading to an increasing use of telecommunication products such as cellular phones. Conventionally, several kinds of technique can be implemented in a cellular phone based communication. For example, an access technique of Time Division Multiple Access (TDMA) and a duplex technique of Frequency Division Duplex (FDD) are adopted in a Global System for Mobile communication (GSM). In the GSM, if there is no need of making a call during a cyclic paging (e.g., one paging per 30 minutes), a cellular phone will not communicate with the GSM for location confirmation after a location updating procedure with respect to the GSM for saving electronic energy of the cellar phone. The GSM system only records the local area (LA) associated with the cellular phone. However, a single location area may cover more than 100 BTSs, each BTS being designated to cover a specified area known as a cell. In case of providing short message services (SMSs) to all cellular phones in some particular cells, the GSM system will confirm which cellular phones in the LA are located in the particular cells by inquiring all BTSs to page all cellular phones sequentially, and then all mobile station integrated services digital networks (MSISDNs) of all cellular phones in the particular cells are obtained. Next, the GSM system will provide SMSs to all cellular phones in some particular cells based on MSISDNs. This inevitably paging will increase the loading of the system and waste system resources significantly. Hence, a need for improvement exists in order to mitigate and/or obviate the aforementioned problems.

SUMMARY OF THE INVENTION

An object of the present invention is to provide an island type mobile communication arrangement capable of obtaining MSISDNs of all cellular phones in island cells for providing a special message service.

Another object of the present invention is to provide an island type mobile communication arrangement capable of obtaining MSISDNs of all cellular phones in island cells without increasing the loading of a mobile communication arrangement.

To achieve the above and other objects, the present invention provides an island type mobile communication arrangement, which comprises: a plurality of BTSs, each corresponding to and set within a cell, and used to provide a mobile communication service to at least one mobile communication device in the cell, a plurality of the cells forming at least one local area including at least one island cell, each island cell having an island BTS; an island BSC connected to the island BTS and used to control the operation whereof; an island MSC connected to the island BSC and used to control the operation whereof, at least one mobile communication device asks the island MSC for location updating while entering the at least one island cell; and an island VLR corresponding to and connected to the island MSC, when the at least one mobile communication device finishes location updating, the island VLR records a MSISDN of each mobile communication device; wherein the island MSC provides a special service to the at least one mobile communication device in the at least one island cell by reading the MSISDNs recorded in the island VLR.

Other objects, advantages, and novel features of the invention will become more apparent from the detailed description when taken in conjunction with the accompanying drawings.

DETAILED DESCRIPTION OF THE PREFERRED EMBODIMENT

Figure 1:
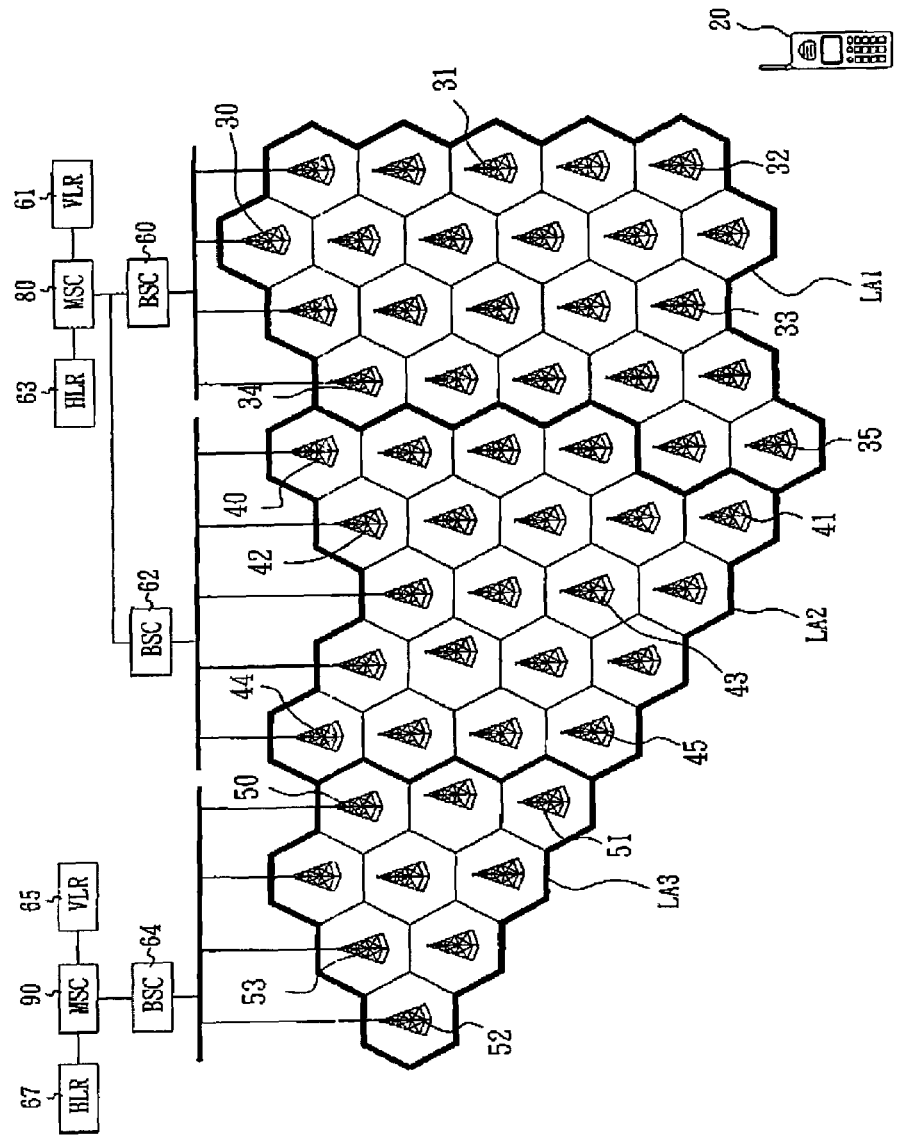
FIG. 1 is a schematic view of a prior GSM.
Figure 2:
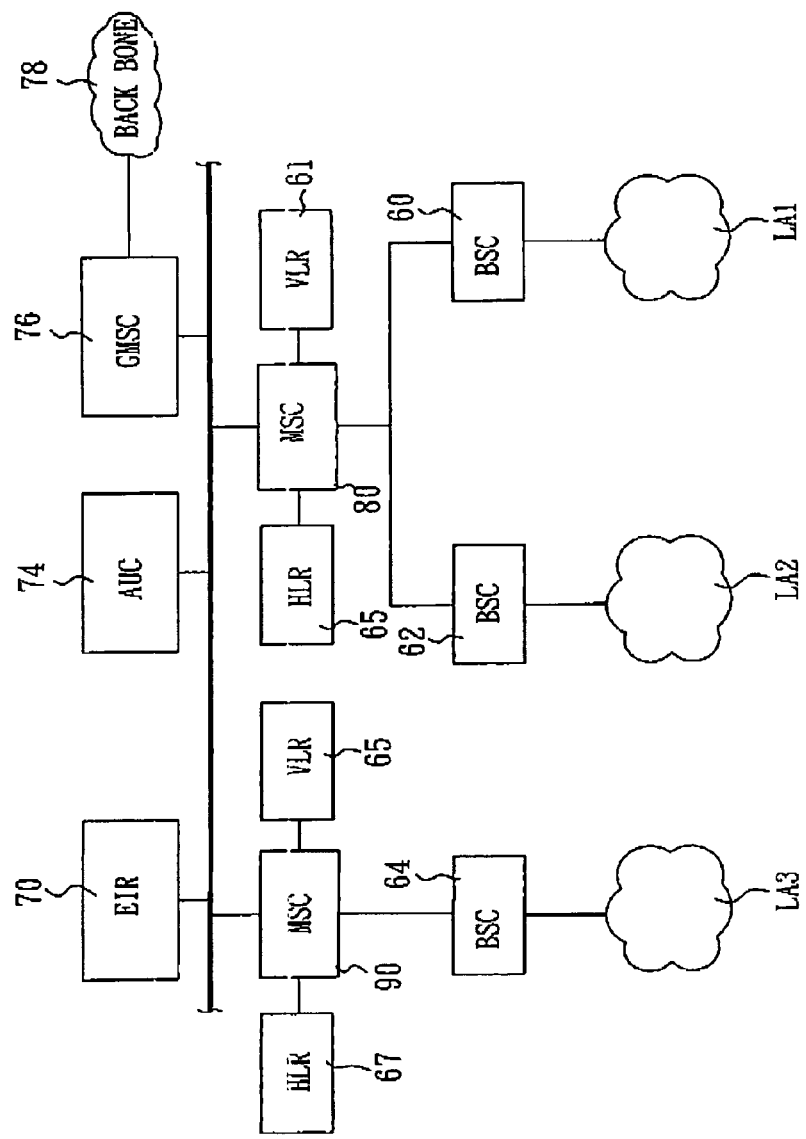
FIG. 2 is a block diagram of the prior GSM.

With reference to FIGS. 1 AND 2, there is shown a well-known GSM network, in which a cellular phone 20 is capable of communicating with another cellular phone. The cellular phone 20 is also known as Mobile Station (MS). The cellular phone 20 is stored with a particular of MSISDN, also known as the number of cellular phone. In case of receiving an incoming call or initiating a call, the GSM knows where the cellular phone 20 is (e.g., LA1 corresponding to BSC 60) by inquiring a Home Location Register (HLR) 72. Then, the BSC 60 will assign one of the BTSs (e.g., BTS 30) to communicate with the cellular phone 20. Each component of the GSM will be described in detail as below.

A Base Transceiver Station (BTS) is adapted to transmit voice to the cellular phone 20 or receive voice from the cellular phone 20. As shown in FIG. 1, BTSs 30, 31, 32, 33, 34, and 35 are arranged in LA1, BTSs 40, 41, 42, 43, 44, and 45 are arranged in LA2, and BTSs 50, 51, 52, and 53 are arranged in LA3, respectively.

A Base Station Controller (BSC) is adapted to control each BTS in an LA so as to communicate with a cellular phone. The BSC is further coupled to a mobile switching center (MSC) for communicating therewith. Each LA has a unique Location Area Identity (LAI) for use as its identification. For example, the BSC 60 is adapted to control all BTSs in LA1. While entering LA1, the cellular phone 20 will store the LAI corresponding to the LA1. Likewise, the BSC 62 is adapted to control all BTSs in LA2. While entering LA2, the cellular phone 20 will store the LAI corresponding to the LA2. The BSC 64 is adapted to control all BTSs in LA3. While entering LA3, the cellular phone 20 will store the LAI corresponding to the LA3.

A visitor location register (VLR) is adapted to record MSISDN of each cellular phone in an LA and provide an inquiry service of the MSISDN to a corresponding MSC. For example, a VLR 65 records the MSISDN of the cellular phone 20 when entering LA3. On the contrary, the VLR 65 deletes the MSISDN when the cellular phone 20 leaves LA3. In such a manner, the MSC 90 can determine whether the cellular phone 20 is in LA3 by inquiring the VLR 65. Likewise, a VLR 61 is adapted to record MSISDN of each cellular phone in LA1 and LA2, and provide an inquiry service of the MSISDN to a corresponding MSC 80. It is understood that one VLR can record the MSISDNs in at least one LA.

The GSM can confirm the position of a cellular phone by inquiring MSISDNs stored in one VLR via the MSC 80 or 90. For example, the MSC 90 inquires the VLR 65 the MSISDN of the cellular phone 20. If the VLR 65 responds the inquiring, the GSM confirms the cellular phone 20 is in LA3, otherwise, the cellular phone is out of LA3.

An equipment identity register (EIR) 70 is adapted to record a unique international mobile equipment identity (IMEI) of a cellular phone. The IMEI is a number set by manufacturer. For example, the GSM will record the IMEI in the EIR 70 when accessing the GSM at the first time, for determining the current status of the cellular phone. The EIR 70 classifies the cellular phone as one of three lists based on the current status of the cellular phone. Namely, a white list means that the cellular phone is in a normal status, a gray list means that the cellular phone is being watched, and a black list means that the cellular phone has been stolen or is out of service.

A home location register (HLR) is adapted to store not only basic data such as special telecommunication services requested by users, routing messages, and designated transfer numbers, but also the identification data. Each cellular phone registers in one HLR. For example, the cellular phone 20 is registered in HLR 63 and recorded in VLR 61. When the cellar phone 20 moves from a cell covered by the BTS 30 to another cell covered by the BTS 50, it means that the cellular phone 20 moves from the LA1 (out of the service of MSC 80) to LA3 (in the service of MSC 90). The cellular phone 20 asks the MSC 90 to provide communication service, the MSC 90 compares the basic data and identification data registered in the HLR 63. If the data is matched, the MSC 90 serves the cellular phone 20 and records MSISDN in VLR 65. It is understood that the MSISDN in VLR 61 will be deleted by the MSC 90.

An authentication center (AUC) 74 is adapted to provide parameters required for performing authentication by the cellular phone 20. The cellular phone 20 will request GSM to authenticate by providing international mobile subscriber identity (IMSI), MSISDN or the like thereto. Next, GSM uses parameters of the cellular phone 20 stored in the AUC 74 to authenticate the cellular phone 20. A temporary mobile subscriber identity (TMSI) and an LAI will be assigned to the cellular phone 20 based on a specified protocol after finishing the authentication of the cellular phone 20 in which the LAI corresponds to the LA of the cellular phone 20. The above procedure is known as location registration. The cellular phone 20 will store the TMSI and the LAI. The cellular phone 20 will request GSM to authenticate by providing TMSI and LAI thereto prior to communicating with GSM. In other words, communication between the cellular phone 20 and GSM is made possible only after finishing the authentication.

There is no need of updating data of the cellular phone 20 when the cellular phone 20 moved from a cell covered by the BTS 30 to a cell covered by the BTS 35 because both cells are controlled by the MSC 80. However, when the cellular phone 20 moves from the cell to another cell covered by the BTS 50, because the cellular phone 20 is out of the service of MSC 80 and in the service of MSC 90, the cellular phone 20 request GSM to update the position by providing TMSI, and LAI thereto. GSM will delete the MSISDN of the cellular phone 20 recorded in the VLR 61 and record the MSISDN in the VLR 65, and assign a new LAI corresponding LA3 to the cellular phone 20. The above process is known location updating.

A gateway MSC (GMSC) 76 is coupled to a backbone 78. The MSC 80 is adapted to transmit voice data from the cellular phone 20 to the backbone 78 or receive voice data from the backbone 78 for being transmitted to the cellular phone 20. The backbone 78 is implemented as an existing network such as ISDN, public system telephone network (PSTN), or public land mobile network (PLMN). GSM can be coupled to a telephone line via PSTN, a remote MSC via ISDN, or GSM of any of other Internet service provider (ISP) via PLMN.

A MSC is one of the switching centers of GSM. Many control and authentication procedures are performed by the MSC. In case of dialing a telephone number by the cellular phone 20 (in LA1), the BSC 60 inquire the MSC 80 to search the position of the number. First, the MSC 80 compares each record in the VLR 61 with the number. If there is no record matched, the MSC 80 reads records in HLRs to determine the position of the number. Hence, the BSC 60 may link the BSC 64 for communicating with another cellular phone. Alternatively, the BSC 60 may link the backbone 78 for communicating with a cord telephone.

The operations of the BSC 60 and 62 are both controlled by the MSC 80. In other words, a single MSC is able to control at least one BSC to provide the communication service. The MSC 80 and 90 both are coupled to the GMSC 76 for communicating with the backbone 78. This enables a telephone to make a call to the cellular phone 20. Also, a cellular phone serviced by GSM of any ISP may make a call to the cellular phone 20, and vice versa.

The typical GSM has been described. In case of communicating between the GSM and the cellular phone 20, GSM first determines the location (i.e., LA) of the cellular phone 20 and assign a suitable BTS to establish a wireless connection with the cellular phone 20. There are three methods performed by GSM in determining the cell of the cellular phone 20 and assigning a suitable BTS. Namely, a first one is that each BTS transmits a paging signal and then waits a response from the cellular phone 20 for determining the cell of the phone 20 and assigning a BTS to establish a wireless connection with the phone 20. This will waste GSM resources and lower the efficiency. A second one is that the cell of the cellular phone 20 is updated by GSM when the phone 20 enters into a new cell. This has a drawback of performing a great number of times of updating by GSM, resulting in a great increase of loading of GSM. A third one is that an LA is composed of many BTSs, and a location updating is performed only when the phone 20 moves from its current LA to a different LA, in which a paging procedure is defined as paging signals transmitted by all BTSs in the same LA. The third method is adopted by the current GSM.

The cellular phone 20 enters into a standby mode when it executes a location registration or location updating procedure. At this time, GSM only knows the current location (i.e., LA) of the cellular phone 20 rather than the current cell of the cellular phone 20. There are three methods performed by GSM in determining the cell of the cellular phone 20. The first one is a cyclically paging. To assure that the cellular phone 20 is still online and in its cell, GSM will periodically page the cellular phone 20. The period of the cycle depends on applications. For example, the period is 30 minutes. The second one is an active paging which is employed when the GSM receives an incoming call of the phone 20. In case of the phone 20 being in a cell covered by the BTS 33, GSM knows the phone 20 is in LA1 via the location updating procedure. If there is an incoming call of the phone 20, GSM requests all BTSs (e.g., BTSs 30, 31, 32, 33, 34, and 35) controlled by the BSC 60 to perform a paging with respect to the phone 20 simultaneously and waits a response from the phone 20. If the response indicates that the cellular phone 20 is in a cell corresponding to the BTS 33. GSM requests the BTS 33 to establish a wireless connection and communicate with the phone 20. A third one is an active paging of cellular phone, which is employed when a cellular phone (e.g., the cellular phone 20) initiates a call. In case of dialing the cellular phone 20, the cellular phone 20 will request a connection with GSM via the BTS 33. In response, GSM communicates with the cellular phone 20 via the BTS 33.

In case that there are three department stores A, B, and C in each of the cells covered by the BTSs 33, 43, and 53 respectively, and the department stores A, B, and C are chain stores, if GSM wants to perform a Short Message Service (SMS) of "All things are 50% discounts" to the consumers near the department stores A, B, and C for promotion, it is hard to achieve the goal without increasing GSM loading. In addition, in some military controlling area, there is a demand of a list of MISIDNs to check the ID of each person. Again, however, GSM is unable to achieve the goal without increasing loading.

Figure 3:
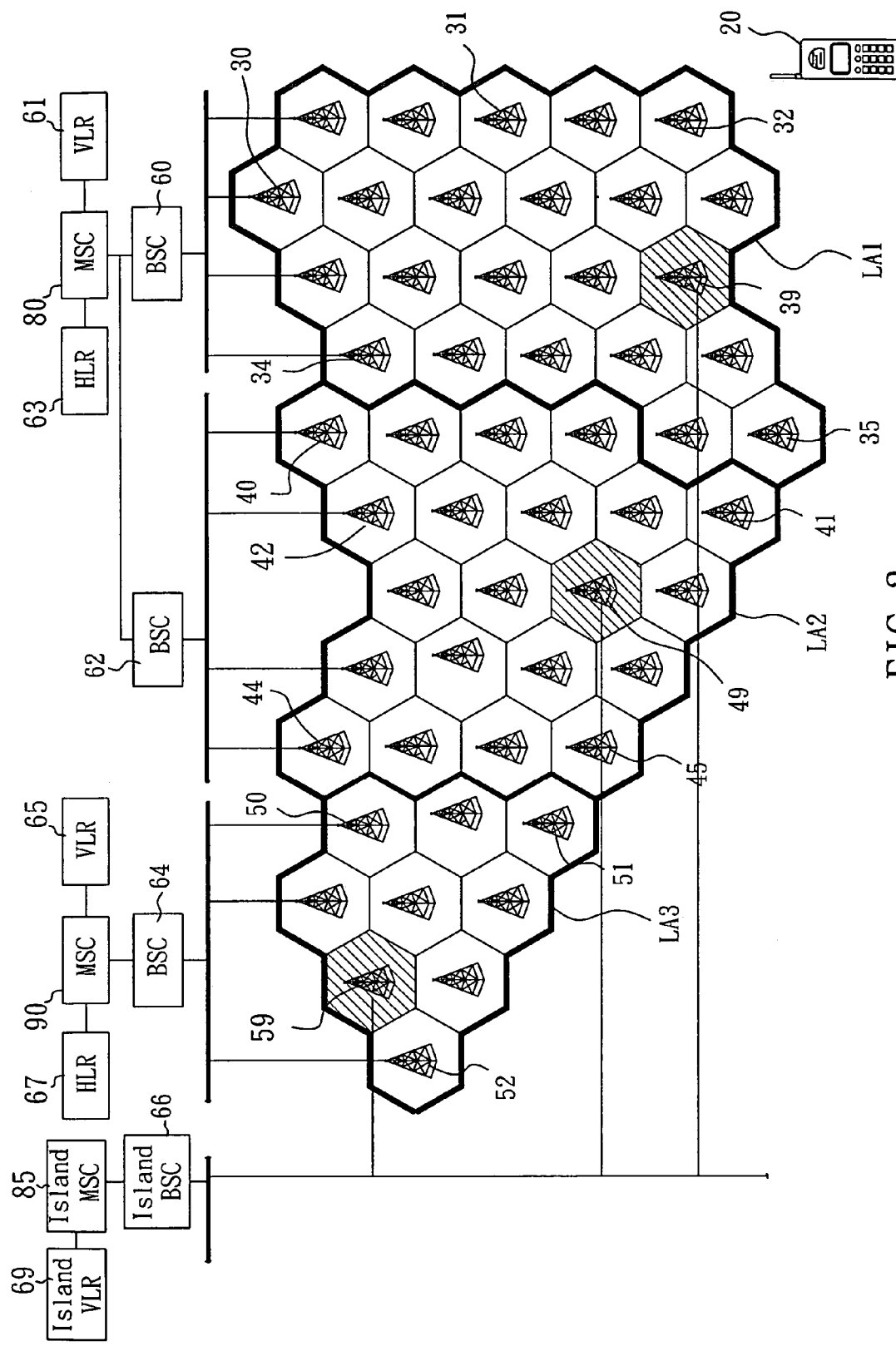
FIG. 3 is a schematic view of the island BSC and cellulars in accordance with the present invention.
Figure 4:
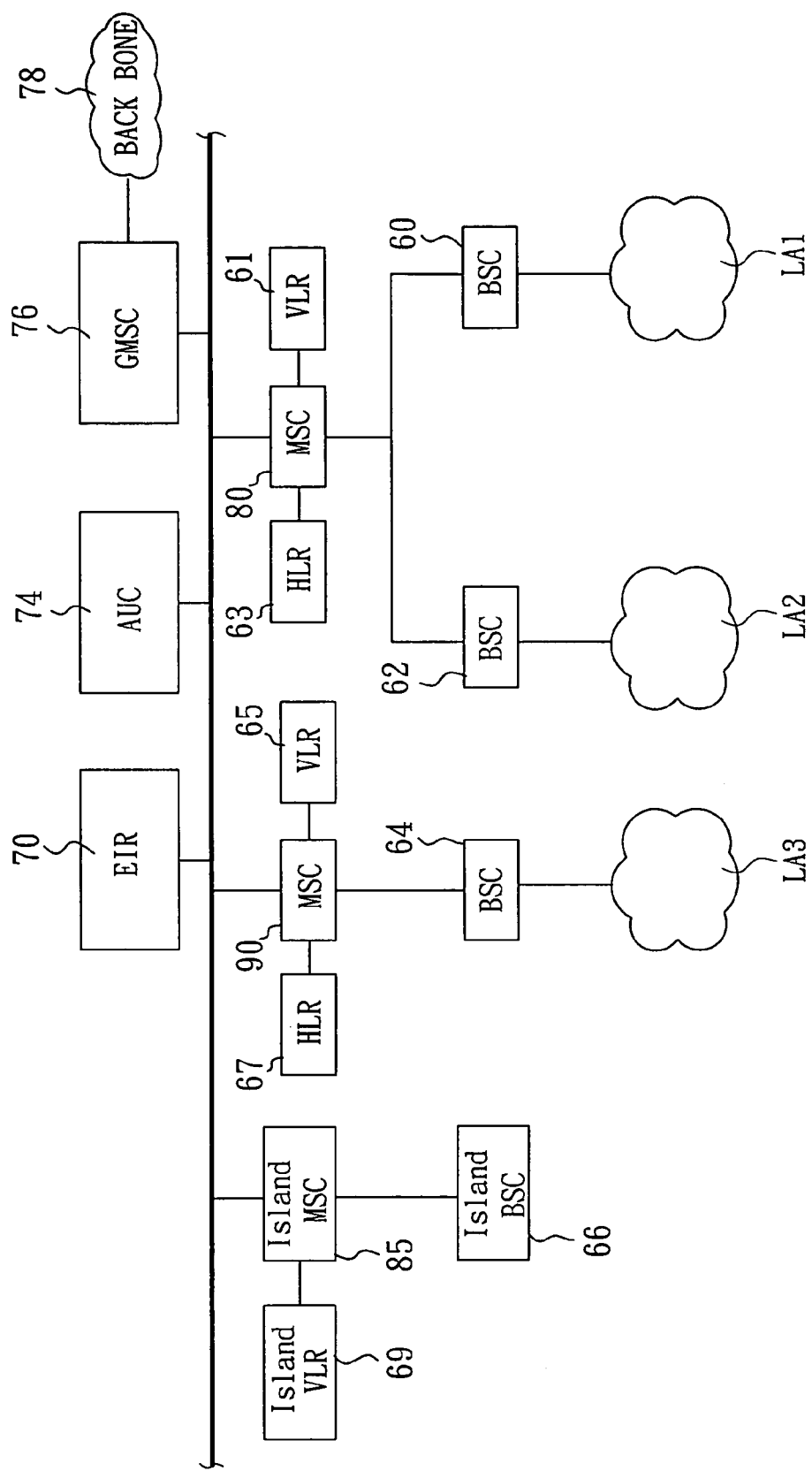
FIG. 4 is a block diagram of the island type mobile communication arrangement in accordance with the present invention.

With reference to FIGS. 3 AND 4, an island type mobile communication arrangement in accordance with the present invention is illustrated. The BTSs 33, 43, and 53 are reassigned as island BTSs 39, 49, and 59 respectively. Also, the island BTSs 39, 49, and 59 are coupled to an island BSC 66 but are not coupled to the BSCs 60, 62, and 64 respectively. Furthermore, an LAI corresponding to the island BTSs 39, 49, and 59 is assigned thereto. As shown in FIG. 3, the island BTSs 39, 49, and 59 are separated. The island BSC 66 is coupled to an island MSC 85, and the island MSC 85 is coupled to an island VLR 67. All cells covered by the BTSs 30, 31, 32, 34, and 35 are corresponding to LA1 and assigned to a particular LAI for communicating with cellular phones. Likewise, all cells covered by the BTSs 40, 41, 42, 44, and 45 are corresponding to LA2 and assigned to a particular LAI for communicating with cellular phones. Also, all cells covered by the BTSs 50, 51, and 52 are corresponding to LA3 and assigned to a particular LAI for communicating with cellular phones. Furthermore, all island cells covered by the island BTSs 39, 49, and 59 are corresponding to island LA and assigned to a particular LAI in which the island BTSs 39, 49, and 59 are communicating with cellular phones. The functionality of the island BSC 66 is the same as that of each of the BSCs 60, 62, and 64. Likewise, the functionality of the island VLR 67 is the same as that of each of the VLRs 61, 63, and 65.

The cellular phone 20 will ask GSM to update the position and record MSISDN of the cellular phone 20 in the island VLR 67 while entering into the island LA from LA1 since the corresponding MSCs are different. It is understood that the VLR 61 will update data and MSISDN of the cellular phone 20. Hence, the island VLR 67 records MSISDNs of all cellular phones in island cells covered by the island BTSs 39, 49, and 59. In case of providing SMS for promotion from the department stores A, B, and C to consumers, GSM will provide the SMS to all MSISDNs recorded in the island VLR 67 sequentially. The GSM can provide a list of MSISDNs by reading the island VLR 67.

Figure 5:
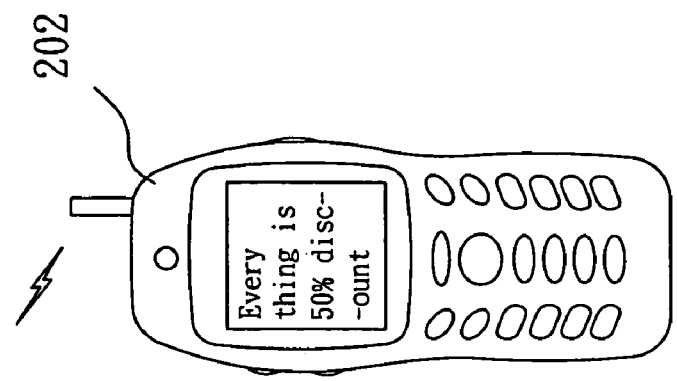
FIG. 5 is a schematic view of special services provided by the island type mobile communication arrangement in accordance with the present invention.
Figure 5:
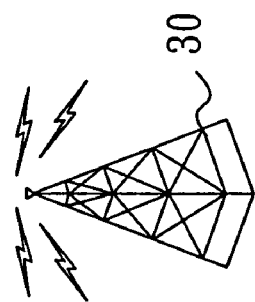
Figure 5:
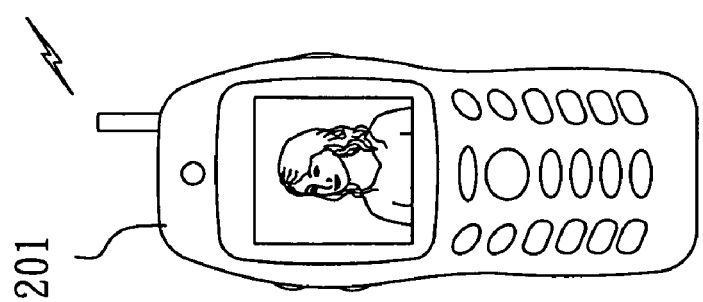

With reference to FIG. 5, the island type mobile communication arrangement of the invention can provide a special service which includes a SMS, a multimedia message service (MMS) or so to each of cellular phones 201 and 202. The MMS is a kind of document format including pictures, animations, voices or movies.

In brief, the invention assigns one BTS in each LA as an island BTS, assigns a particular LAI to the island BTS, and records MSISDN of the cellular phone 20 in the island VLR 67. As such, the island type mobile communication arrangement can know all MSISDNs in the island BTSs by reading records of the island VLR 67 prior to initiating a SMS. The island type mobile communication arrangement substantially has the same structure as that of the prior GSM. Also, the communication protocol or operation of the GSM is not changed by the invention. The mobile location detection method will not involve any additional paging with respect to the cellular phones with only a few times of location updating performed. As a result, GSM resources are well preserved. Moreover, the invention is also applicable to any of other mobile communication systems, such as universal mobile telecommunications system (UMTS) or third generation mobile communication system, since any of the above identified mobile communication systems is substantially the same as GSM except that different protocols are employed in communicating with a cellular phone, each one of the above identified mobile communication system is a cell based system. The cellular phone can be replaced by personal digital assistant (PDA), smart phone or laptop which can communicate with the mobile communication arrangements via a communication module.

Although the present invention has been explained in relation to its preferred embodiment, it is to be understood that many other possible modifications and variations can be made without departing from the spirit and scope of the invention as hereinafter claimed.

What is claimed is:

1. An island type mobile communication arrangement, comprising:

a plurality of BTSs, each corresponding to and set within a cell, and used to provide a mobile communication service to at least one mobile communication device in the cell, a plurality of the cells forming at least one location area including at least one island cell, the at least one island cell having an island BTS and corresponding to an island location area which is different from the location area;

an island BSC connected to the island BTS and used to control the operation whereof;

an island MSC connected to the island BSC and used to control the operation whereof, at least one mobile communication device asks the island MSC for location updating while entering the at least one island cell as the mobile communication device moves from a cell corresponding to the location area into the island cell corresponding to the island location area which is different from the location area; and an island VLR corresponding to and connected to the island MSC, when the at least one mobile communication device finishes location updating, the island VLR records a MSISDN of each mobile communication device;

wherein the island MSC provides a special service to the at least one mobile communication device in the at least one island cell by reading the MSISDNs recorded in the island VLR.

2. The island type mobile communication arrangement as claimed in claim 1, wherein the special service is a short message service.

3. The island type mobile communication arrangement as claimed in claim 1, wherein the special service is a multimedia message service.

4. The island type mobile communication arrangement as claimed in claim 1, further comprising:
- at least one BSC corresponding to the at least one local area, each BSC connects to the BTSs in the corresponding local area and controlling the operation thereof;
- at least one MSC corresponding to and connected to the at least one BSC, and controlling the operation thereof;
- at least one VLR corresponding to and connected to the at least one BSC, and used to record the MSISDN of each mobile communication device in the cell corresponding to one of the BTSs; and
- at least one HLR corresponding to and connected to the at least one MSC, and used to record basic data and identification data of the at least one mobile communication device.

5. The island type mobile communication arrangement as claimed in claim 4, wherein when one of the mobile communication devices enters into the cell corresponding to one of the BTSs, the VLR corresponding to the BTS records the MSISDN of the mobile communication device; when the mobile communication device enters into the cell corresponding to the island BTS, the island VLR records the MSISDN of the mobile communication device, and the VLR deletes the MSISDN therein.

6. The island type mobile communication arrangement as claimed in claim 4, wherein the at least one MSC is coupled to at least one EIR, HLR, AUC, and GMSC.

7. The island type mobile communication arrangement as claimed in claim 6, wherein the island MSC is coupled to the at least one EIR, HLR, AUC, and GMSC.

8. The island type mobile communication arrangement as claimed in claim 1, wherein the island type mobile communication arrangement is a kind of cell based communication arrangement.

9. The island type mobile communication arrangement as claimed in claim 8, wherein the cell based communication arrangement is a GSM.

10. The island type mobile communication arrangement as claimed in claim 8, wherein the cell based communication arrangement is a UMTS.

11. The island type mobile communication arrangement as claimed in claim 8, wherein the cell based communication arrangement is a third generation mobile communication arrangement.

12. The island type mobile communication arrangement as claimed in claim 1, wherein the mobile communication device is a cellular phone.

13. The island type mobile communication arrangement as claimed in claim 1, wherein the mobile communication device is a PDA.

14. The island type mobile communication arrangement as claimed in claim 1, wherein the mobile communication device is a smart phone.

* * * * *